(12) United States Patent
Ishida et al.

(10) Patent No.: US 9,733,424 B2
(45) Date of Patent: Aug. 15, 2017

(54) MULTICORE FIBER AND METHOD OF MANUFACTURING THE SAME

(71) Applicant: FUJIKURA LTD., Tokyo (JP)

(72) Inventors: Itaru Ishida, Sakura (JP); Shoichiro Matsuo, Sakura (JP)

(73) Assignee: FUJIKURA LTD., Tokyo (JP)

( * ) Notice: Subject to any disclaimer, the term of this patent is extended or adjusted under 35 U.S.C. 154(b) by 65 days.

(21) Appl. No.: 14/703,003

(22) Filed: May 4, 2015

(65) Prior Publication Data

US 2015/0323736 A1 Nov. 12, 2015

(30) Foreign Application Priority Data

May 8, 2014 (JP) ................................ 2014-097157

(51) Int. Cl.
*G02B 6/02* (2006.01)
*C03B 37/012* (2006.01)
*C03B 37/027* (2006.01)

(52) U.S. Cl.
CPC .... *G02B 6/02042* (2013.01); *C03B 37/01222* (2013.01); *C03B 37/01225* (2013.01); *C03B 37/01231* (2013.01); *C03B 37/027* (2013.01); *C03B 2203/02* (2013.01); *C03B 2203/10* (2013.01); *C03B 2203/34* (2013.01)

(58) Field of Classification Search
CPC ................................................ G02B 6/02042
See application file for complete search history.

(56) References Cited

U.S. PATENT DOCUMENTS 5,519,801 A 5/1996 Le Noane et al.
9,025,239 B2 * 5/2015 Zhu ..................... H01S 3/06737
359/341.1

2012/0251045 A1 * 10/2012 Budd ..................... G02B 13/26
385/33
2013/0074551 A1 3/2013 Sasaoka
2013/0322835 A1 * 12/2013 Butler .................. G02B 6/4403
385/114

FOREIGN PATENT DOCUMENTS

| JP | 2010-286548 A | | 12/2010 |
|----|---------------|---|---------|
| JP | 2010286548 A | * | 12/2010 |
| JP | 2012247703 A | * | 12/2012 |
| JP | 2013-72963 A | | 4/2013 |
| JP | 2015-118270 A | | 6/2015 |

OTHER PUBLICATIONS

Office Action dated Mar. 1, 2016, issued in counterpart Japanese Application No. 2014-097157, with English Translation (6 pages).

* cited by examiner

*Primary Examiner* — Michelle R Connelly

(74) *Attorney, Agent, or Firm* — Westerman, Hattori, Daniels & Adrian, LLP

(57) ABSTRACT

A multicore fiber according to an embodiment of the present invention includes a plurality of cores and a cladding that encloses the plurality of the cores. The external form of the cladding in a cross section is formed of an arc portion that is formed in an arc shape relative to the center axis of the cladding and a non-arc portion that is pinched between two ends of the arc portion and not formed in an arc shape relative to the center axis of the cladding. The non-arc portion is formed with a pair of projections projecting from two ends of the arc portion on the opposite side of the center axis relative to a straight line connecting the both ends of the arc portion and one or more of recesses pinched between the pair of the projections.

2 Claims, 8 Drawing Sheets

MULTICORE FIBER AND METHOD OF MANUFACTURING THE SAME

BACKGROUND OF THE INVENTION

The present invention relates to a multicore fiber and a method of manufacturing the multicore fiber, which are suitable for the case where an alignment of optical axes is facilitated.

Presently, an optical fiber for use in optical fiber communication systems, which are generally popular, is in a structure in which one core is enclosed with a cladding, in which an optical signal is propagated through the inside of the core and information is transmitted.

In the optical fiber communication system in these years, a large number of from a few tens to a few hundreds of optical fibers are used, and the amount of information for transmission is dramatically increased. In order to decrease the number of optical fibers in such an optical fiber communication system, a multicore fiber is proposed in which a plurality of cores is enclosed with a cladding.

For example, in a multicore fiber described in Patent Document 1 below, 16 cores are enclosed with a cladding, and a flat external portion is formed on the external form of the cladding. This multicore fiber is manufactured in which a flat external portion is formed on a part of the external form of a multicore fiber preform and the multicore fiber preform is drawn.

[Patent Document 1] JP-A-2013-72963

SUMMARY OF THE INVENTION

Meanwhile, in the case where a multicore fiber is connected to another multicore fiber, the cladding at the end portion of the multicore fiber to be connected is placed on the mounting stage of an alignment jig. In this case, it can be thought that in the multicore fiber described in Patent Document 1 above, the flat external portion of the cladding is placed on the mounting stage and the alignment in the rotation direction of the multicore fiber can be omitted.

However, in the manufacture method described above, such a tendency is observed that both ends of the flat external portion formed on a part of the external form of the multicore fiber preform is not a little rounded because of heat when the multicore fiber preform is drawn.

Therefore, there is concern that when this rounded external portion is placed on a predetermined mounting stage, the multicore fiber is unsteady on the mounting stage, and the alignment of optical axes becomes difficult.

Therefore, it is an object of the present invention to provide a multicore fiber that can facilitate the alignment of optical axes and a method of manufacturing the multicore fiber.

In order to solve the above-described object, the present invention includes a multicore fiber including: a plurality of cores; and a cladding enclosing the plurality of the cores, wherein an external form of the cladding in a cross section is formed of an arc portion that is formed in an arc shape relative to a center axis of the cladding and a non-arc portion that is not formed in an arc shape and pinched between both ends of the arc portion relative to the center axis of the cladding, and the non-arc portion is formed with a pair of projections projecting from the both ends of the arc portion on an opposite side of the center axis relative to of a straight line connecting the both ends of the arc portion and one or more of recesses pinched between the pair of the projections.

In this multicore fiber, in the case where one recess is formed on the non-arc portion, a pair of the projections can be support points when the multicore fiber is placed on a predetermined mounting stage. Therefore, even though the tip ends of the pair of the projections connected to both ends of the arc portion are rounded, the multicore fiber can be supported at two points, two projections, in order to stabilize the multicore fiber.

Moreover, in the case where two or more of recesses are formed on the non-arc portion, a projection is provided between the adjacent recesses. In the case where the projection is located at the center axis side relative to the straight line connecting the tip ends of a pair of the projections, the multicore fiber can be supported at two points, in which the pair of the projections is connected to both ends of the arc portion, in order to stabilize the multicore fiber, similar to the case where one recess is formed on the non-arc portion.

On the other hand, in the case where the projection provided between the recesses adjacent to each other is located on the opposite side of the center axis relative to the straight line connecting the tip ends of the pair of the projections connected to both ends of the arc portion, the multicore fiber can be supported at two points, which are the projection and the pair of the projections connected to both ends of the arc portion, in order to stabilize the multicore fiber.

As described above, in the multicore fiber according to an aspect of the present invention, the multicore fiber can be supported at two points formed on the external form of the multicore fiber so as to stabilize the multicore fiber, so that the alignment in the rotation direction of the multicore fiber can be omitted. Accordingly, a multicore fiber that can facilitate the alignment of optical axes is implemented.

Moreover, preferably, an intermediate projection is formed between the pair of the projections, the intermediate projection projecting on an opposite side of the center axis relative to a straight line connecting tip ends of the pair of the projections.

In the case where this configuration is provided, a configuration in which the multicore fiber is supported at two points, one of the pair of the projections connected to both ends of the arc portion and the intermediate projection, and a configuration in which the multicore fiber is supported at two points, the other of the pair of the projections and the intermediate projection can be changed according to the position and shape of the intermediate projection, for example. Therefore, even though there are two disposition forms of the cores in the multicore fiber, the alignment in the rotation direction of the multicore fiber can be omitted.

Furthermore, preferably, the plurality of the cores is arranged in parallel with a straight line connecting tip ends of the pair of the projections.

In the case where this configuration is provided, the configuration is advantageous under the situations that two or more planar waveguides having cores disposed in a row are connected to each other, for example, as compared with the case where a plurality of cores is not arranged in parallel with a straight line connecting the tip ends of the pair of the projections.

In addition, in order to solve the problem, a method of manufacturing a multicore fiber according to an aspect of the present invention is a method of manufacturing a multicore fiber including: boring a plurality of insertion through holes in a cladding rod along a longer direction of the cladding rod; inserting a core sheath rod having a core rod coated with a glass layer individually into the plurality of the insertion through holes; integrating the cladding rod with the core sheath rod by heating the cladding rod and the core sheath rod; and drawing a rod integrated in the integrating. In the boring, separated from the plurality of the insertion through holes, at least one or more of recess forming holes that recess a part of an outer circumferential surface of the cladding rod are bored along the longer direction of the cladding rod.

In the method of manufacturing the multicore fiber, after the integrating process, a cladding rod is obtained in which at least a part of the inner wall surface of the recess forming hole is a part of the outer circumferential surface of the cladding rod. In the external form of this cladding rod in a cross section, a portion corresponding to the recess forming hole is a non-arc portion that is not formed in an arc shape relative to the center axis of the cladding rod.

Although the size of the non-arc portion is different from the size of the cladding described above, the external form of the non-arc portion is almost the same as the external form of the cladding described above. In other words, the cladding rod nearly in an analog to the cladding described above can be obtained, and the cladding described above can be obtained by drawing the cladding rod.

Therefore, as described above, the multicore fiber is manufactured in which the multicore fiber can be supported at two points formed on the external form of the multicore fiber so as to stabilize the multicore fiber, so that the alignment in the rotation direction of the multicore fiber can be omitted. Accordingly, a method of manufacturing the multicore fiber is implemented in which the alignment of optical axes can be facilitated.

It is noted that it may be fine that the integrating and the drawing are performed simultaneously.

As described above, according to an aspect of the present invention, there are provided a multicore fiber that can facilitate the alignment of optical axes and a method of manufacturing the multicore fiber.

DETAILED DESCRIPTION OF THE INVENTION

In the following, preferred embodiments of the present invention will be described in detail with reference to the drawings.

(1) First Embodiment

Figure 1:
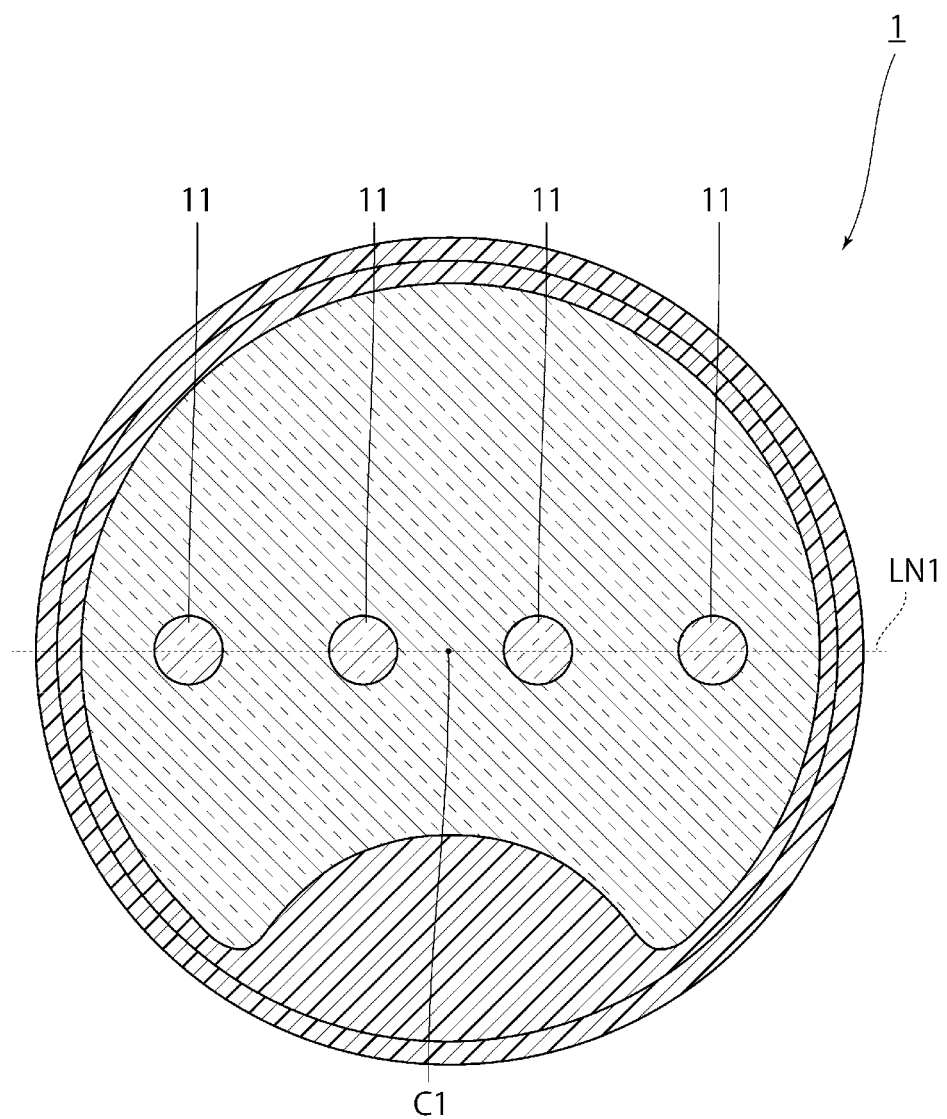
FIG. 1 is a diagram of a cross section perpendicular to the longer direction of a multicore fiber according to a first embodiment.

FIG. 1 is a diagram of a cross section perpendicular to the longer direction of a multicore fiber 1 according to an embodiment. As depicted in FIG. 1, a multicore fiber 1 according to the embodiment includes a plurality of cores 11, a cladding 12 that encloses the plurality of the cores 11, a first protective layer 13 that encloses the cladding 12, and a second protective layer 14 that encloses the first protective layer 13 as main components.

The plurality of the cores 11 is disposed as the cores 11 are arranged on a straight line LN1 passed through a center axis C1 of the cladding 12.

Figure 2:
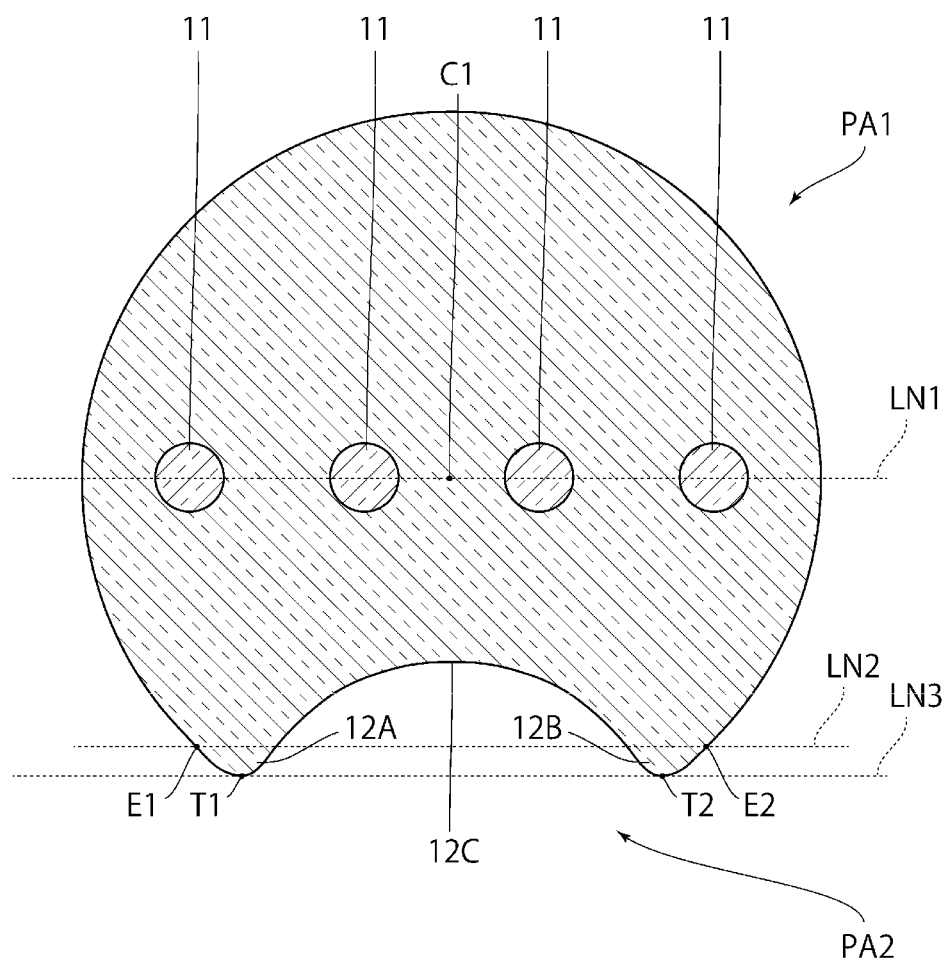
FIG. 2 is a diagram of cores and a cladding observed from the same viewpoint in FIG. 1.

FIG. 2 is a diagram of the cores 11 and the cladding 12 observed from the same viewpoint in FIG. 1. As depicted in FIG. 2, the cladding 12 has an external form different from a cylindrical external form.

More specifically, the external form of the cladding 12 in the cross section is formed of an arc portion PA1 that is formed in an arc shape relative to the center axis C1 of the cladding 12 and a non-arc portion PA2 that is pinched between both ends of the arc portion PA1 and not formed in an arc shape relative to the center axis C1 of the cladding 12. In the embodiment, the length of the external form of the arc portion PA1 is greater than the length of the external form of the non-arc portion PA2.

The non-arc portion PA2 is formed with a pair of projections 12A and 12B projecting from two ends E1 and E2 of the arc portion PA1 on the opposite side of the center axis C1 relative to a straight line LN2 connecting the two ends E1 and E2 of the arc portion PA1 and a single recess 12C pinched between the pair of the projections 12A and 12B.

In the embodiment, the recess 12C is recessed to the center axis C1 side beyond the straight line LN2 connecting the two ends E1 and E2 of the arc portion PA1, and tip ends T1 and T2 of the pair of the projections 12A and 12B are rounded. Moreover, the plurality of the cores 11 is disposed in parallel with a straight line LN3 connecting the tip ends T1 and T2 of the pair of the projections 12A and 12B.

It is noted that in the embodiment, the straight line LN3 connecting the tip ends T1 and T2 of the pair of the projections 12A and 12B is in parallel with the straight line LN2 connecting the two ends E1 and E2 of the arc portion PA1. However, it may be fine that the straight line LN3 is not in parallel with the straight line LN2.

In the case where the multicore fiber 1 is connected to another multicore fiber, the first protective layer 13 (FIG. 1) and the second protective layer 14 (FIG. 1) at the end portion to be connected are removed in the multicore fiber 1. The cladding 12 exposed from the first protective layer 13 and the second protective layer 14 is placed on the mounting stage of an alignment jig use for the alignment of the optical axes of the cores 11 of the multicore fiber 1 with the optical axes of the cores of another multicore fiber.

As described above, the external form of the cladding 12 in the cross section has the pair of the projections 12A and 12B projecting from the two ends E1 and E2 of the arc portion PA1 on the opposite side of the center axis C1 relative to the straight line LN2 connecting the two ends E1 and E2 of the arc portion PA1. Moreover, the recess 12C is formed between the pair of the projections 12A and 12B.

In the cladding 12, the pair of the projections 12A and 12B can be support points when the multicore fiber 1 is placed on a predetermined mounting stage. Therefore, even though the tip ends T1 and T2 of the pair of the projections 12A and 12B are rounded, the multicore fiber 1 can be supported at two points, the projection 12A and 12B, in order to stabilize the multicore fiber 1.

Thus, in the multicore fiber 1 according to the embodiment, the alignment in the rotation direction can be omitted in the multicore fiber 1. Accordingly, the multicore fiber 1 that can facilitate the alignment of optical axes is implemented.

Moreover, in the case of the embodiment, the plurality of the cores 11 is arranged in parallel with the straight line LN3 connecting the tip ends T1 and T2 of the pair of the projections 12A and 12B.

Therefore, the multicore fiber 1 is advantageous under the situations that two or more planar waveguides having cores disposed in a row are connected to each other, for example, as compared with the case where a plurality of the cores 11 is not arranged in parallel with the straight line LN3 connecting the tip ends of the pair of the projections.

Figure 3:
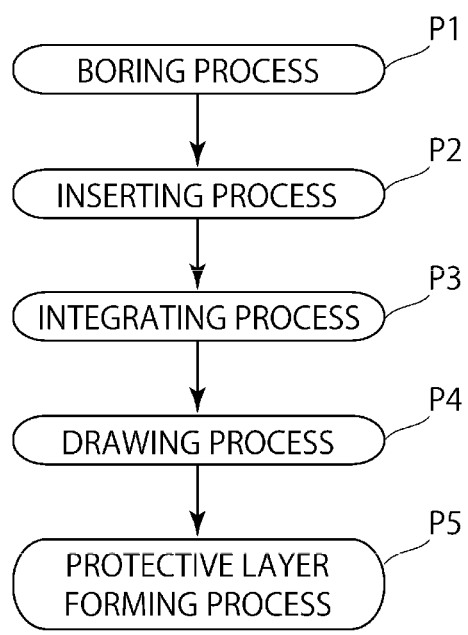
FIG. 3 is a flowchart of a method of manufacturing the multicore fiber.

Next, a method of manufacturing the multicore fiber 1 will be described in detail with reference to the drawings. FIG. 3 is a flowchart of the method of manufacturing the multicore fiber 1. As depicted in FIG. 3, the method of manufacturing the multicore fiber 1 includes a boring process P1, an inserting process P2, an integrating process P3, a drawing process P4, and a protective layer forming process P5 as main processes.

<Boring Process>

Figure 4:
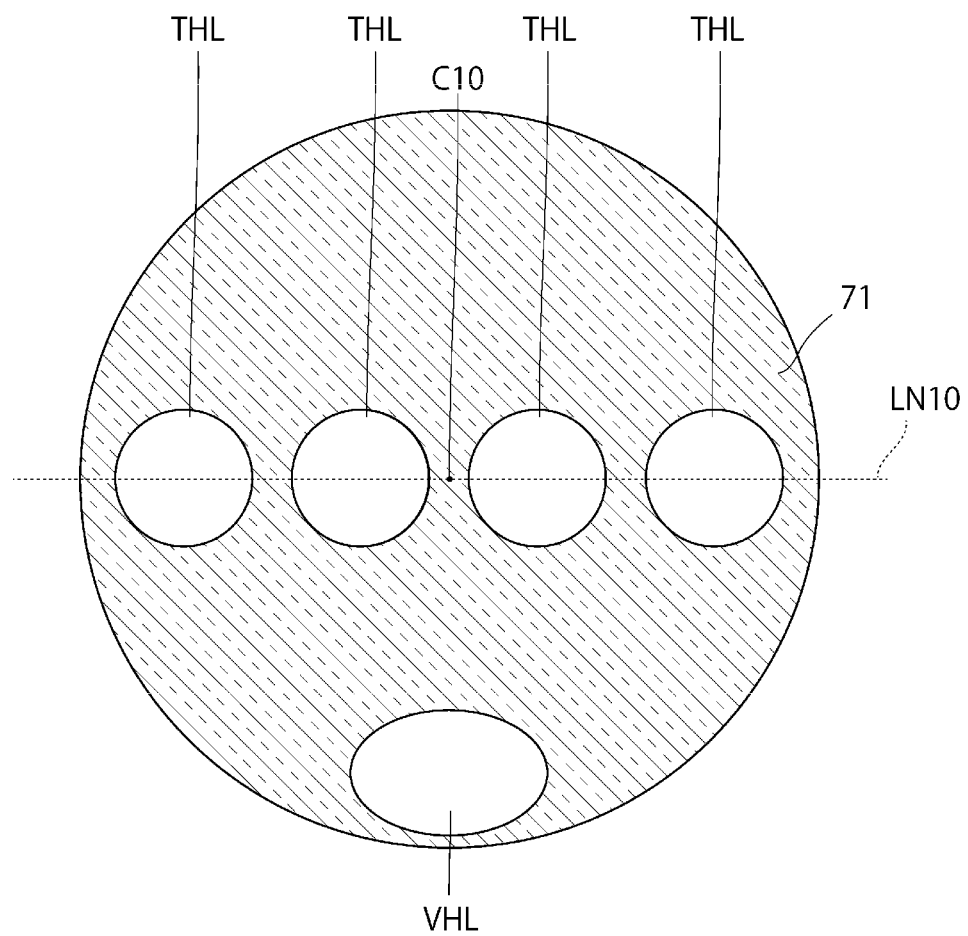
FIG. 4 is a diagram of a cross section after a boring process.

FIG. 4 is a diagram of a cross section after the boring process. As depicted in FIG. 4, in the boring process P1, a plurality of insertion through holes THL is bored in a cladding rod 71 along the longer direction of the cladding rod 71.

Moreover, separately from the insertion through holes THL, one recess forming hole VHL for recessing a part of the outer circumferential surface of the cladding rod 71 is bored in the cladding rod 71 along the longer direction of the cladding rod 71.

In the case of the embodiment, the plurality of the insertion through holes THL is bored as the insertion through holes THL are arranged on a straight line LN10 passed through a center axis C10 of the cladding rod 71. In the example depicted in FIG. 3, the recess forming hole VHL is in an elliptic shape having a cross sectional area greater than the cross sectional area of the insertion through hole THL, and bored near the outer circumferential surface of the cladding rod 71.

It is noted that it may be fine that the shortest distance between the recess forming hole VHL and the outer circumferential surface of the cladding rod 71 is shorter than the shortest distance between the outermost insertion through hole THL and the outer circumferential surface of the cladding rod 71. This is because in the integrating process P3, it can be facilitated that a part of the cladding rod 71 is placed into the recess forming hole VHL and the portion placed into the recess forming hole VHL is integrated with the inner circumferential surface of the recess forming hole VHL.

The insertion through hole THL and the recess forming hole VHL are similarly bored using a drill, for example. It is noted that the cladding rod 71 is a cylindrical glass body, and is formed of pure silica, for example.

<Inserting Process>

Figure 5:
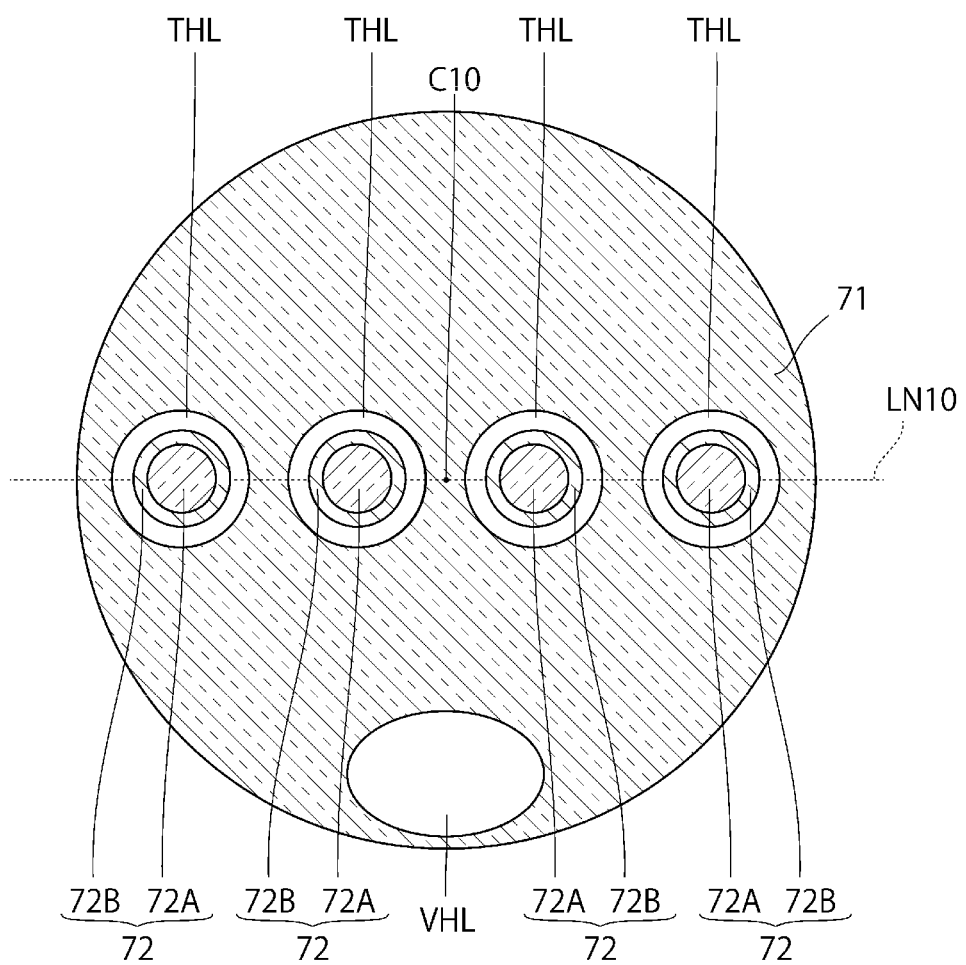
FIG. 5 is a diagram of a cross section after an inserting process.

FIG. 5 is a diagram of a cross section after the inserting process. As depicted in FIG. 5, in the inserting process P2, a core sheath rod 72 is individually inserted into the plurality of the insertion through holes THL bored in the boring process P1.

The core sheath rod 72 is a member inserted into any of the insertion through holes THL, and the core sheath rod 72 is in a two-layer structure in which a core rod 72A is coated with a glass layer 72B. The average refractive index of the core rod 72A is higher than the average refractive index of the glass layer 72B. For example, the core rod 72A is formed of silica doped with a dopant such as germanium, and the glass layer 72B is formed of pure silica. It is noted that the average refractive index of the glass layer 72B is almost the same as the average refractive index of the cladding rod 71.

<Integrating Process>

Figure 6:
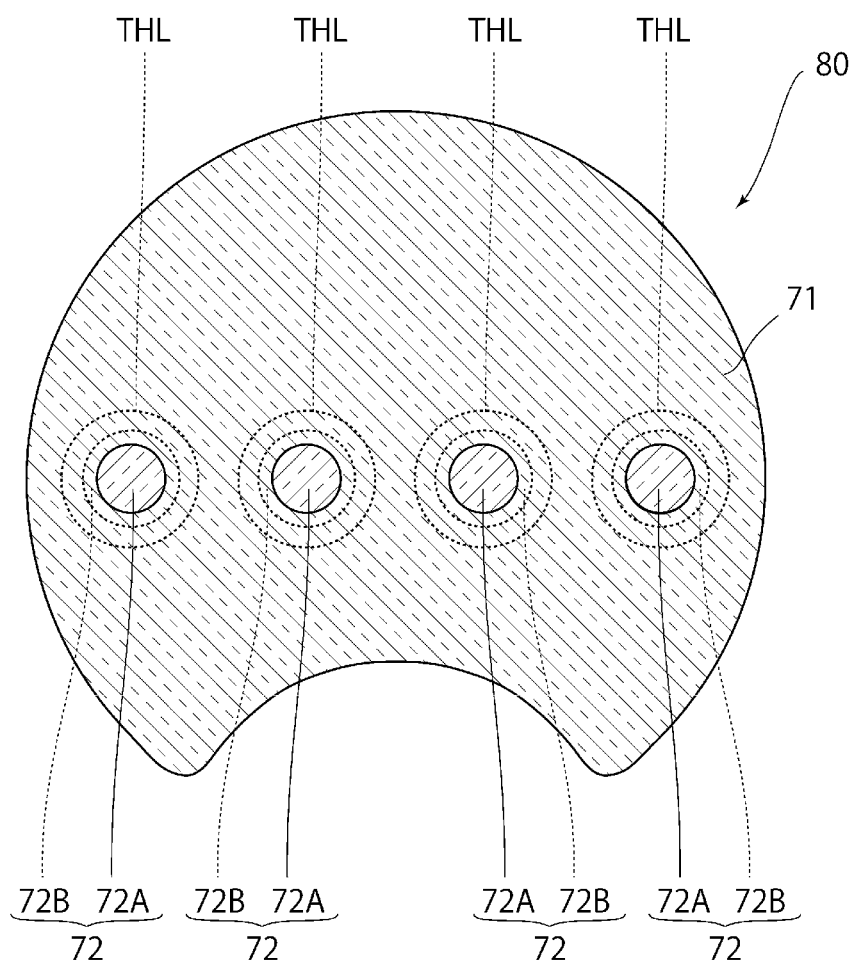
FIG. 6 is a diagram of a cross section after an integrating process.

FIG. 6 is a diagram of a cross section after the integrating process. As depicted in FIG. 6, in the integrating process P3, the cladding rod 71 and the core sheath rods 72 are heated, the cladding rod 71 is integrated with the core sheath rods 72, and a multicore fiber preform 80 is obtained.

More specifically, the cladding rod 71 and the core sheath rods 72 inserted into the insertion through holes THL of the cladding rod 71 are heated in a vacuum. In the case where the cladding rod 71 and the core sheath rods 72 are heated, stress is produced in the cladding rod 71 due to the contraction of the cladding rod 71, for example, to fill the insertion through holes THL, and the cladding rod 71 is fusion-spliced and integrated with the glass layer 72B, which is the outer layer of the core sheath rod 72.

At this time, a part of the cladding rod 71 is placed into the recess forming hole VHL, the portion placed into the recess forming hole VHL is fusion-spliced and integrated with the inner circumferential surface of the recess forming hole VHL. Thus, in the external form of the cladding rod 71 in the cross section, the portion corresponding to the recess forming hole VHL is a non-arc portion that is not formed in an arc shape relative to the center axis of the cladding rod 71. Although the size of the non-arc portion is different from the size of the cladding 12 described above, the external form of the non-arc portion is almost the same as the external form of the cladding 12 described above. In other words, the cladding rod 71 in an analog to the cladding 12 is obtained.

<Drawing Process>

In the drawing process P4, the rod (the multicore fiber preform 80) integrated in the integrating process P3 is drawn.

More specifically, an end forming process is applied as pre-processing in which one end of the multicore fiber preform 80 obtained in the integrating process P3 is formed in a conical projection. It is noted that it may be fine that the end forming process is applied in the integrating process P3.

The multicore fiber preform 80 is then placed in a drawing furnace, and heated in the drawing furnace until the projection of the multicore fiber preform 80 is melted. The melted projection of the multicore fiber preform 80 is then drawn, and the drawn portion is cooled to an appropriate temperature using a cooling device.

As a result, the core rod 72A in the drawn portion is formed as the core 11, and the glass layer 72B and the cladding rod 71, which are fusion-spliced with each other in the portion, are formed as the cladding 12.

<Protective Layer Forming Process>

In the protective layer forming process P5, the protective layers are formed around the cladding 12. More specifically, the outer circumferential surface of the cladding 12 is coated with an ultraviolet curable resin, for example, and ultraviolet rays are applied to the ultraviolet curable resin to form the first protective layer 13.

After that, the outer circumferential surface of the first protective layer 13 is coated with an ultraviolet curable resin, for example, and ultraviolet rays are applied to the ultraviolet curable resin to form the second protective layer 14. Accordingly, the multicore fiber 1 depicted in FIG. 1 is manufactured.

As described above, in the method of manufacturing the multicore fiber 1, the non-arc portion PA2 can be formed on the cladding 12 as long as the recess forming hole VHL is bored by a method similar to the boring method for the insertion through hole THL in boring the insertion through hole THL in the boring process P1 without changing the later processes P2 to P5 at all.

(2) Second Embodiment

Next, a second embodiment will be described in detail with reference to the drawings. However, in components of a multicore fiber according to the second embodiment, the components the same as or equivalent to the components according to the first embodiment are designated the same reference numerals and signs, and the overlapping description will be appropriately omitted.

Figure 7:
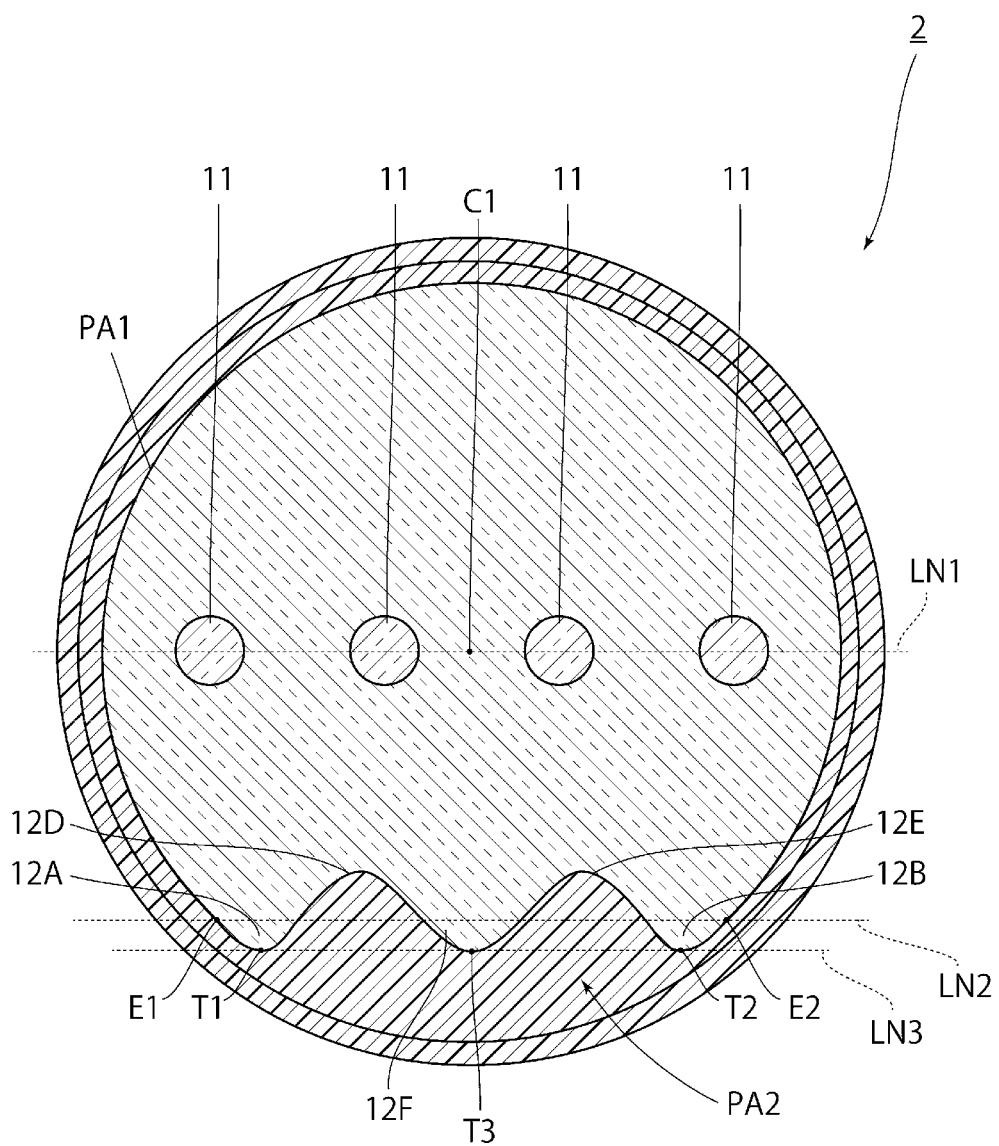
FIG. 7 is a diagram of a cross section perpendicular to the longer direction of a multicore fiber according to a second embodiment.

FIG. 7 is a diagram of a cross section perpendicular to the longer direction of a multicore fiber 2 according to the second embodiment. As depicted in FIG. 7, the multicore fiber 2 according to the embodiment is different from the first embodiment only in that the structure of the non-arc portion PA2 is changed.

More specifically, in the first embodiment, a single recess 12C is formed between the pair of the projections 12A and 12B. On the other hand, in the embodiment, two recesses 12D and 12E are formed between a pair of projections 12A and 12B, and an intermediate projection 12F is formed between the recesses 12D and 12E.

In the case of the embodiment, the recess 12D is recessed from the projection 12A connected to one end E1 of an arc portion PA1 to the center axis C1 side relative to a straight line LN2 connecting two ends E1 and E2 of the arc portion PA1. Moreover, the recess 12E is recessed from the projection 12B connected to an other end E2 of the arc portion PA1 to the center axis C1 side relative to the straight line LN2 connecting the two ends E1 and E2 of the arc portion PA1.

Furthermore, in the case of the embodiment, the intermediate projection 12F is located between the two recesses 12D and 12E, and a tip end T3 of the intermediate projection 12F is located on a straight line LN3 connecting tip ends T1 and T2 of the pair of the projections 12A and 12B.

In a cladding 12 of the multicore fiber 2, the pair of the projections 12A and 12B and the intermediate projection 12F can be support points when the multicore fiber 2 is placed on a predetermined mounting stage. Thus, similar to the case of the first embodiment, even though the tip ends T1 and T2 of the pair of the projections 12A and 12B are rounded, the multicore fiber 2 can be supported at two points, in order to stabilize the multicore fiber 2.

Therefore, similar to the case of the first embodiment, also in the multicore fiber 2 according to the embodiment, the alignment in the rotation direction can be omitted in the multicore fiber 2.

In the case where the multicore fiber 2 is manufactured, only the boring process P1 described above is changed.

Figure 8:
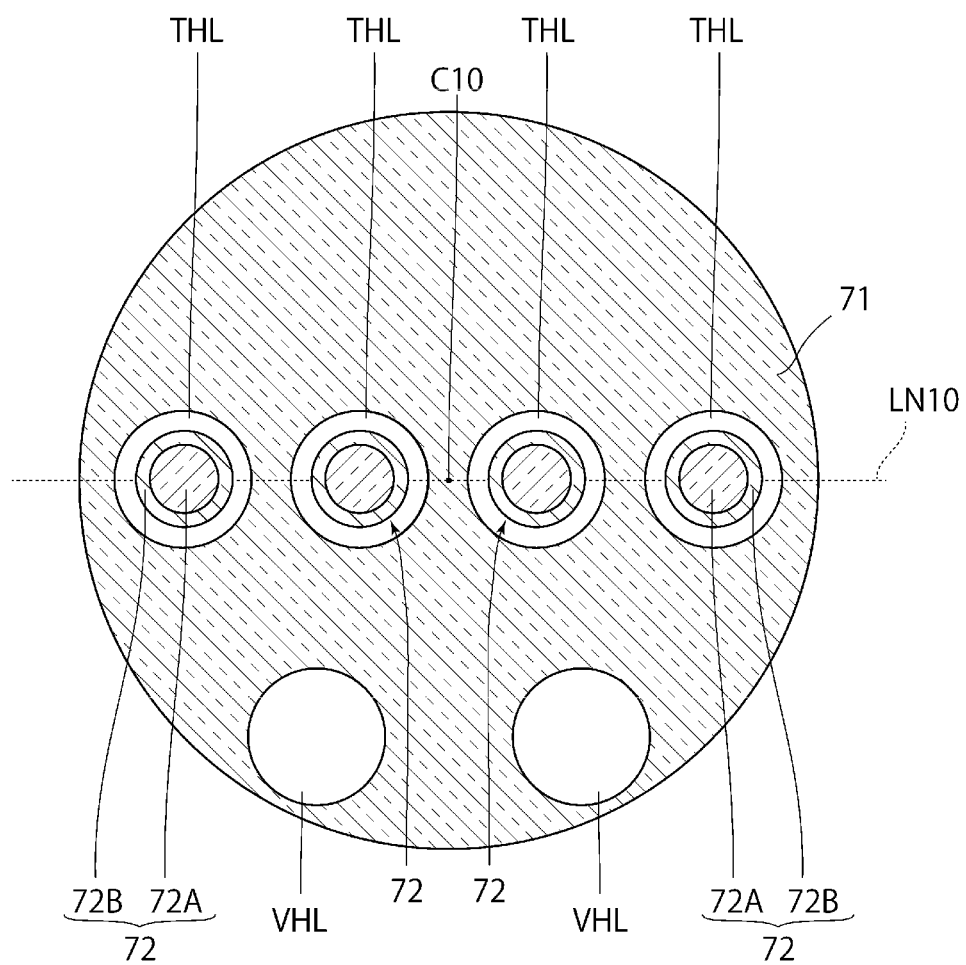
FIG. 8 is a diagram of a cross section after a boring process according to the second embodiment.

FIG. 8 is a diagram of a cross section after a boring process according to the second embodiment. As depicted in FIG. 8, in a boring process P1 according to the embodiment, it is fine that two recess forming holes VHL are bored in a cladding rod 71 along the longer direction of the cladding rod 71.

It is noted that in the example depicted in FIG. 7, the sizes of the recess forming holes VHL are almost the same as the size of an insertion through hole THL, and bored near the outer circumferential surface of the cladding rod 71. Moreover, the recess forming holes VHL are bored in line symmetry relative to a straight line passed through the center axis of the cladding rod 71 in the direction orthogonal to the direction in which a plurality of the insertion through holes THL is arranged.

(3) Exemplary Modifications

As described above, the first embodiment and the second embodiment are described as examples. However, the multicore fiber according to an embodiment of the present invention and the method of manufacturing the same are not limited to the foregoing embodiments.

For example, in the foregoing embodiments, the plurality of the cores 11 is arranged and disposed on the straight line passed through the center axis C1 of the cladding 12. However, it may be fine that the plurality of the cores 11 is arranged on a straight line other than the straight line passed through the center axis C1 of the cladding 12. Moreover, it may be fine that the plurality of the cores 11 is not arranged on a straight line. For example, such a disposition structure is applicable in which a single core 11 is disposed on the center axis C1 of the cladding 12 and a plurality of the cores 11 is disposed around the core 11 at regular intervals. It is noted that in the foregoing embodiments, the case is shown as an example where the number of the cores is four. However, the number of the cores may be two or greater.

Furthermore, in the foregoing embodiments, the recess forming hole VHL in a circular cross section is bored in the cladding rod 71. However, it may be fine that the cross sectional form of the recess forming hole VHL is in a shape other than a circular shape. In addition, it may be fine that the recess forming hole VHL is not formed in the cladding rod 71. For example, a recess forming hole in a semicircular groove in a cross section can be bored on a part of the outer circumferential surface of the cladding rod 71 along the longer direction of the cladding rod 71.

Moreover, in the foregoing embodiments, the tip ends T1 and T2 of the pair of the projections 12A and 12B are rounded. However, it may be fine that the tip ends T1 and T2 are pointed by polishing, for example, or planarized.

Furthermore, in the second embodiment, the intermediate projection 12F is located between the two recesses 12D and 12E, and the tip end T3 of the intermediate projection 12F is located on the straight line LN3 connecting the tip ends T1 and T2 of the pair of the projections 12A and 12B.

However, the intermediate projection 12F may be located or may not be located between the recesses 12D and 12E, and the tip end T3 of the intermediate projection 12F may be located on the center axis C1 side beyond the straight line LN3 connecting the tip ends T1 and T2 of the pair of the projections 12A and 12B.

In short, the effects similar to the first embodiment and the second embodiment can be obtained, as long as the external form of the cladding 12 between the pair of the projections 12A and 12B is located on the center axis C1 side relative to the straight line LN3 connecting the tip ends T1 and T2 of the pair of the projections 12A and 12B.

On the other hand, it may be fine that the intermediate projection 12F projects on the opposite side of the center axis C1 relative to the straight line LN3 connecting the tip ends T1 and T2 of the pair of the projections 12A and 12B. In the case where this configuration is provided, a configuration in which the multicore fiber is supported at two points, one of the pair of the projections 12A and 12B connected to the two ends E1 and E2 of the arc portion PA1 and the intermediate projection 12F and a configuration in which the multicore fiber is supported at two points, the other of the pair of the projections 12A and 12B and the intermediate projection 12F are changed according to the position and shape of the intermediate projection 12F, for example. Therefore, even though there are two disposition forms of the cores in the multicore fiber, the alignment in the rotation direction of the multicore fiber can be omitted. In order to manufacture the multicore fiber including the cladding 12, the multicore fiber can be adjusted by the disposition of the two recess forming holes VHL, for example.

The multicore fiber according to an embodiment of the present invention and a method of manufacturing the same can be appropriately combined, omitted, modified, and additionally provided with known techniques other than the description above within the scope not deviating from the object of the present application.

The invention claimed is:

1. A multicore fiber comprising:
   a plurality of cores; and
   a cladding enclosing the plurality of the cores, wherein
   an external form of the cladding in a cross section is formed of an arc portion that is formed in an arc shape relative to a center axis of the cladding and a non-arc portion that is not formed in an arc shape and pinched between both ends of the arc portion relative to the center axis of the cladding, and
   the non-arc portion is formed with a pair of projections projecting from the both ends of the arc portion on an opposite side of the center axis relative to a straight line connecting the both ends of the arc portion and one or more of recesses pinched between the pair of the projections,
   wherein an intermediate projection is formed between the pair of the projections, the intermediate projection projecting on an opposite side of the center axis relative to a straight line connecting tip ends of the pair of the projections.

2. The multicore fiber according to claim 1, wherein the plurality of the cores is arranged in parallel with a straight line connecting tip ends of the pair of the projections.

\* \* \* \* \*